(12) United States Patent
Yuan et al.

(10) Patent No.: US 11,997,633 B2
(45) Date of Patent: May 28, 2024

(54) TIMING ADJUSTMENTS FOR DATA TRANSMISSION IN WIRELESS SYSTEMS

(71) Applicant: ZTE Corporation, Guangdong (CN)

(72) Inventors: Zhifeng Yuan, Guangdong (CN); Hong Tang, Guangdong (CN); Weimin Li, Guangdong (CN); Yuzhou Hu, Guangdong (CN); Jian Li, Guangdong (CN); Qiujin Guo, Guangdong (CN); Yihua Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 224 days.

(21) Appl. No.: 17/372,964

(22) Filed: Jul. 12, 2021

(65) Prior Publication Data

US 2021/0345274 A1    Nov. 4, 2021

Related U.S. Application Data

(63) Continuation of application No. PCT/CN2019/071483, filed on Jan. 11, 2019.

(51) Int. Cl.
*H04W 56/00* (2009.01)
*H04W 64/00* (2009.01)
*H04W 84/06* (2009.01)

(52) U.S. Cl.
CPC ....... *H04W 56/006* (2013.01); *H04W 64/006* (2013.01); *H04W 84/06* (2013.01)

(58) Field of Classification Search
CPC . H04W 56/006; H04W 64/006; H04W 84/06; H04W 56/0015; H04W 56/0045; H04W 56/007

See application file for complete search history.

(56) References Cited

U.S. PATENT DOCUMENTS 10,200,148 B1 * 2/2019 Gao .................. H04L 1/206
10,616,910 B2   4/2020 Xu et al.
(Continued)

FOREIGN PATENT DOCUMENTS

CN    102711273 A    10/2012
CN    105144817 A    12/2015
(Continued)

OTHER PUBLICATIONS

CNIPA, Notification to Complete Formalities of Registration for Chinese Application No. 201980088435.7, mailed on Feb. 14, 2023, 4 pages with unofficial translation.
(Continued)

*Primary Examiner* — Christine Ng
(74) *Attorney, Agent, or Firm* — Perkins Coie LLP

(57) ABSTRACT

Methods, systems, and devices for timing adjustments for data transmissions in mobile communication technology are described. An exemplary method for wireless communication includes determining, by the first device, a distance between the first device and the second device, and performing a transmission based on a timing adjustment that is determined using the distance. Another exemplary method for wireless communication includes broadcasting, by the second device, a location information of the second device, and receiving, from the first device, a transmission, where the first device is configured to communicate the transmission based on a timing adjustment that is determined using the distance, and where the distance is based on a location information of the first device and the location information of the second device.

17 Claims, 7 Drawing Sheets

(56) References Cited

U.S. PATENT DOCUMENTS

| | | | |
|---|---|---|---|
| 2004/0228305 A1* | 11/2004 | Grieco | H04L 1/0056 370/335 |
| 2005/0053099 A1 | 3/2005 | Spear et al. | |
| 2007/0021121 A1* | 1/2007 | Lane | H04W 56/006 455/67.16 |
| 2009/0034506 A1* | 2/2009 | Wijayanathan | H04B 7/2643 370/345 |
| 2009/0238126 A1 | 9/2009 | Sato et al. | |
| 2010/0111028 A1* | 5/2010 | Kim | H04W 76/28 370/329 |
| 2010/0177732 A1* | 7/2010 | Watanabe | H04L 5/0058 370/330 |
| 2011/0003551 A1* | 1/2011 | Kameno | H04W 52/325 455/352 |
| 2013/0029669 A1* | 1/2013 | Boudreau | H04W 16/28 455/444 |
| 2014/0293881 A1 | 10/2014 | Khoshnevis et al. | |
| 2014/0302872 A1 | 10/2014 | Lane et al. | |
| 2015/0124673 A1* | 5/2015 | Ouchi | H04W 52/58 370/311 |
| 2015/0349930 A1* | 12/2015 | Sazawa | H04L 43/16 370/254 |
| 2016/0211994 A1* | 7/2016 | Sagong | H04L 27/0008 |
| 2016/0278021 A1* | 9/2016 | Takeda | H04W 52/267 |
| 2017/0230156 A1 | 8/2017 | Fakoorian et al. | |
| 2018/0249453 A1* | 8/2018 | Nagaraja | H04B 7/0632 |
| 2018/0252793 A1* | 9/2018 | Hazlewood | G01S 5/18 |
| 2018/0317225 A1* | 11/2018 | Akkarakaran | H04L 5/0051 |
| 2020/0037366 A1* | 1/2020 | Cui | H04W 74/0833 |
| 2020/0077424 A1* | 3/2020 | Baldemair | H04L 27/2602 |
| 2020/0196342 A1* | 6/2020 | Lin | H04L 5/0048 |
| 2020/0245175 A1* | 7/2020 | Zhang | H04W 72/04 |

FOREIGN PATENT DOCUMENTS

| | | |
|---|---|---|
| CN | 106793057 A | 5/2017 |
| CN | 103687001 B | 8/2017 |
| CN | 108604972 A | 9/2018 |
| WO | 2016138632 A1 | 9/2016 |
| WO | 2018064367 A1 | 4/2018 |

OTHER PUBLICATIONS

Partial European Search Report for EP Patent Application No. 19849830.5, dated Dec. 10, 2021 (14 pages).

Co-Pending Chinese Application No. 201980088435.7, Second Chinese Office Action dated Oct. 20, 2022, 61 pages with unofficial translation.

International Search Report and Written Opinion mailed on Sep. 27, 2019 for International Application No. PCT/CN2019/071483, filed on Jan. 11, 2019 (7 pages).

European Search Report for EP Patent Application No. 19849830.5, dated Mar. 16, 2022 (13 pages).

* cited by examiner

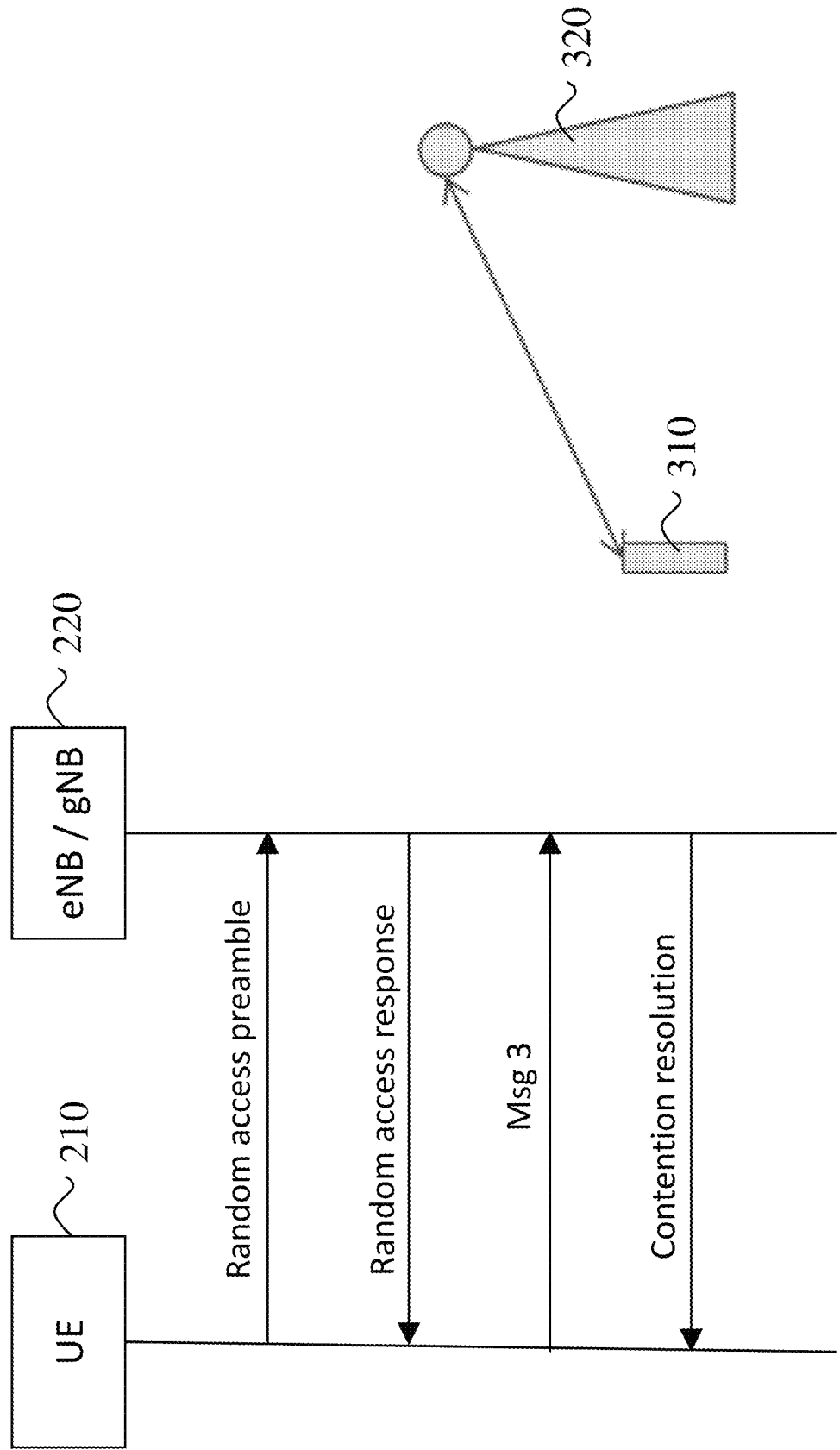

TIMING ADJUSTMENTS FOR DATA TRANSMISSION IN WIRELESS SYSTEMS

CROSS-REFERENCE TO RELATED APPLICATIONS

This application is a continuation of International Patent Application No. PCT/CN2019/071483, filed on Jan. 11, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement timing adjustments for data transmissions.

SUMMARY

This document relates to methods, systems, and devices for generating sequences for reference signals in mobile communication technology, including 5th Generation (5G), Beyond 5th Generation (B5G) and New Radio (NR) communication systems.

In one exemplary aspect, a wireless communication method is disclosed. The method includes determining, by the first device, a distance between the first device and the second device, and performing a transmission based on a timing adjustment that is determined using the distance.

In another exemplary aspect, a wireless communication method is disclosed. The method includes broadcasting, by the second device, a location information of the second device, and receiving, from the first device, a transmission, where the first device is configured to communicate the transmission based on a timing adjustment that is determined using the distance, and where the distance is based on a location information of the first device and the location information of the second device.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 2 shows an example of a four-step random access procedure.

FIG. 3 shows an example of timing adjustment, in accordance with some embodiments of the presently disclosed technology.

DETAILED DESCRIPTION

There is an increasing demand for fourth generation of mobile communication technology (4G, the 4th Generation mobile communication technology), Long-Term Evolution (LTE), Advanced LTE (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

In an existing LTE system, one important feature of the uplink transmission is that the UE (User Equipment) operates using Orthogonal Multiple Access (OMA) in the time-frequency domain, e.g. using Orthogonal Frequency Division Multiplexing (OFDM). This ensures that the uplink transmissions of different UEs in the same cell do not interfere with each other. In order to ensure the orthogonality of the uplink transmission and the intra-cell interference, the base station (including the evolved Node B) requires different frequency domain resources (e.g., resource blocks (RBs)) from the same subframe. The time at which the signals of different UEs arrive at the base station are substantially aligned. The base station can correctly decode the uplink data as long as it receives the uplink data transmitted by the UE within the span of the cyclic prefix (CP). Therefore, uplink synchronization requires that signals from different UEs in the same subframe arrive at the base station with time of arrivals within the CP. In order to ensure time synchronization on the receiving side (base station or network node side), the LTE standard proposes a mechanism of uplink timing advance. The timing advance (TA) value is a parameter that characterizes the timing offset of the data received by the base station from a particular UE. The base station can control the time when the uplink signals from different UEs arrive at the base station by appropriately controlling the timing offset of each UE. For example, a UE that is far away from the BS will be subject to a large transmission delay, and thus, a UE that is further away from the BS may be required to send uplink data in advance of the UE that is closer to the BS.

In some embodiments, the base station determines the TA value of each UE by measuring the uplink transmission of the corresponding UE, and sends the determined TA value to the UE through a timing advance command (TAC). Examples of the uplink transmission that can be used to measure the TA value include the physical random access channel (PRACH) preamble, the Sounding Reference Signal (SRS), the Demodulation Reference Signal (DMRS), Channel Quality Indication (CQI), Acknowledgement (ACK) or Non-Acknowledge (NACK) messages, Physical Uplink Shared Channel (PUSCH) messages, Physical Uplink Control Channel (PUCCH) messages, etc.

Figure 1:
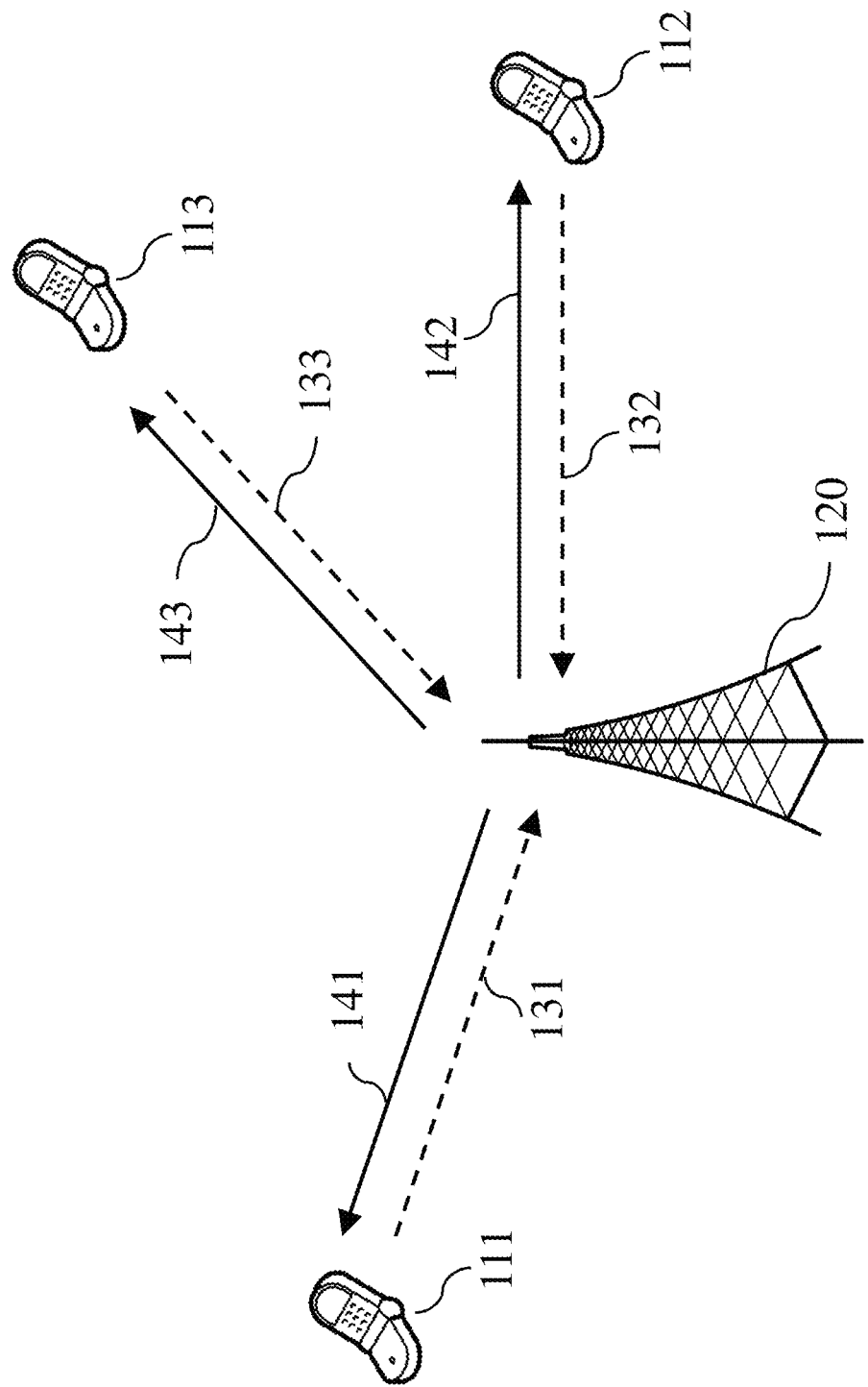
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS (e.g., a network node, eNB, gNB) 120 and one or more user equipment (UE) 111, 112 and 113. In some embodiments, the downlink transmissions (141, 142, 143) may include the timing adjustment values, and the subsequent uplink transmissions (131, 132, 133) are communicated based on the TA values, as described by the presently disclosed technology. The UE may be, for example, a smartphone, a tablet, a mobile computer, a machine to machine (M2M) device, a terminal, a mobile device, an Internet of Things (IoT) device, and so on.

In some embodiments, the BS sends a timing advance command (TAC) to the UE in two ways. In the first, the base station determines the TA value by measuring the received preamble and sends it through the RAR TAC field during the random access procedure. In the second, the base station needs to maintain the TA information in the RRC (Radio Resource Control) connection state.

Although the UE and the eNodeB (eNB) obtain uplink synchronization during the random access procedure, the timing of the uplink signal arriving at the eNodeB may change with time, so the UE needs to continuously update its TA to maintain uplink synchronization. In the LTE system, the base station uses a closed loop mechanism to adjust the uplink timing advance. The base station configures a timer for the UE through RRC signaling. The timer is called a Time Alignment Timer (TAT) at the MAC layer. The UE uses the timer to determine whether the uplink is synchronized at the MAC layer. In general, when the UE receives the TAC (from the RAR or TAC Media Access Control (MAC) control unit), the UE starts or restarts the timer. If the timer expires, it is assumed that the uplink is out of synchronization, and the UE clears the Hybrid Automatic Repeat reQuest (HARM) buffer, notifies the RRC layer to release the PUCCH/SRS, and clears any configured downlink assignment (DL assignment) and uplink grant (UL grant). When the timer is running, the UE assumes that the uplink is synchronized. In addition, when the timer is not running (i.e., the uplink is out of synchronization), the UE can only send the preamble on the uplink.

In some embodiments, and when the uplink is out of synchronization, the UE can only initiate a random access procedure to establish a connection with the cell and obtain uplink synchronization. An existing implementation of the contention-based random access procedure includes four steps, as shown in FIG. 2. As shown therein, the UE 210 transmits a random access preamble over a PRACH occasion in a first step. In a second step, the UE obtains a timing according to the information sent over the downlink shared channel (DL-SCH) by the network node (e.g., base station, eNB, gNB) 220. In some embodiments, the timing may include a timing advance (TA), which may also be called a timing adjustment amount, an arrival delay difference amount or timing alignment amount. The UE further obtains, for example, an MCS indication, and a frequency hopping indication that is associated with the third step transmission information, e.g., the uplink transmission scheduling related to Msg3. The third step is to transmit Msg3 on a physical uplink shared channel (PUSCH) according to the timing adjustment information sent by the base station and the uplink data transmission scheduling information. In some embodiments, Msg3 includes information such as a connection request and a user identifier. In a fourth step, the UE receives a contention resolution message (referred to as Msg4) that is based on the user identification information (e.g., UE ID) received by the network node.

The Msg4 (including the user identifier and the random access request response message feedback) communication to the UE is based on the PRACH, which is a specific sequence selected from the PRACH resource pool that is configured for the base station, and wherein the UE randomly selects the PRACH transmission from the configured resource pool. In some cases, there may be two UEs that select the same PRACH occasion (time/frequency position and preamble index), and the base station is unable to distinguish two UEs during the PRACH detection process. Thus, in step four, base stations rely on the user ID carried in Msg3 in the third step to identify whether or not to allow users to access successfully; if the UEs do not receive feedback comprising information associated with their own identity from the base station, the random access procedure is deemed unsuccessful.

In the case of the 4-step random access procedure, the determination and adjustment of the TA is relatively accurate, but relies on a closed-loop with the UE. The base station and the UE must be in a connected state, and the data transmission efficiency is low. With the emergence of massive connectivity and low latency service requirements, these scenarios require simple, grant-free access, and do not expect TAs to introduce closed-loop mechanisms.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Exemplary Embodiments for Open-Loop Timing Adjustments

In some of the embodiments described below, the receiver may be a receiver on a satellite, a drone, a hot air balloon equipped with a receiving device, or the like. In other embodiments described below, the transmitter may be in an active state, an inactive state or an idle state. In yet other embodiments described below, satellite positioning system includes, but is not limited to, a GPS positioning system, a GLONASS positioning system, a Beidou positioning system or a Galileo positioning system.

Embodiment 1. In some embodiments, and shown in FIG. 3, location information is broadcast by the base station 320 and received by the UE 310. In an example, the broadcast information may be explicit location bit information (e.g., coordinates in a predetermined coordinate system), which usually requires FEC coding protection. In another example, the broadcast information may be pilot sequences, wherein different pilot sequences represent different location information.

Having obtained the location of the BS 320 via the broadcast, the UE 310 may determine its location using, for example, a satellite positioning system, a ground positioning system, a cellular positioning system or a positioning system based on a base station. Based on the location information of the base station and its own location information, the distance d between the UE and the BS is calculated by the following formula:

$$d=\sqrt{(x_1-x_2)^2+(y_1-y_2)^2}.$$

Herein, $(x_1, y_1)$ is the location of the terminal and $(x_2, y_2)$ is the location of the base station. Given this distance, the timing adjustment $(t_{TA})$ may be computed as:

$$t_{TA}=2d/c$$

Herein, c is the speed of light. Having computed the timing adjustment, the UE transmits data to the base station according to $t_{TA}$. In some embodiments, a modulation and coding scheme (MCS) and/or retransmission times may be determined based on distance d or a threshold when transmitting the data.

In some embodiments, the subcarrier spacing of the time-frequency resource for transmitting data may be 60 kHz, 30 kHz, 15 kHz, 7.5 kHz, 3.75 kHz or 1.25 kHz, and the data symbols are CP-OFDM symbols or DFT-S-OFDM symbols. In some embodiments, the transmitted data may include user identification information, establishment cause, uplink signaling information or information of the downlink beams transmitted by the base station and acquired by the UE. In an example, the user identification information may be a unique ID of length 39 bits or may be a unique ID of length 48 bits or may be a temporary ID of 16 bits, such as a C-RNTI. Furthermore, the transmitted data may additionally include at least one of the following: (a) data symbols processed by a spreading technique, (b) a pilot symbol or a reference signal or (c) a preamble sequence. In some embodiments, the transmitted data may include the information of the spreading code or the index of the spreading code in a code set or the information of the generation of the spreading code. For example, when the k-th modulation symbol of the user is $s_k$, it is spread by a spreading sequence of length L, where the spreading sequence is $[c_{k1}, c_{k2}, \ldots, c_{kL}]$ with $L \geq 1$, resulting in the spread symbol being given as:

$$s_k*[c_{k1},c_{k2},\ldots,c_{kL}]=[s_k c_{k1}, s_k c_{k2}, \ldots, s_k c_{kL}].$$

In an example, the cyclic prefix of the data (for the CP-OFDM or DFT-S-OFDM waveform) is an extended CP (ECP) as defined in LTE or 5G NR, which is greater than the sum of the residual TA error and the multipath delay of the channel.

Embodiment 2. In some embodiments, location information is broadcast by the base station and received by the UE. In an example, the broadcast information may be explicit location bit information (e.g., coordinates in a predetermined coordinate system), which usually requires FEC coding protection. In another example, the broadcast information may be pilot sequences, wherein different pilot sequences represent different location information.

Figure 4A:
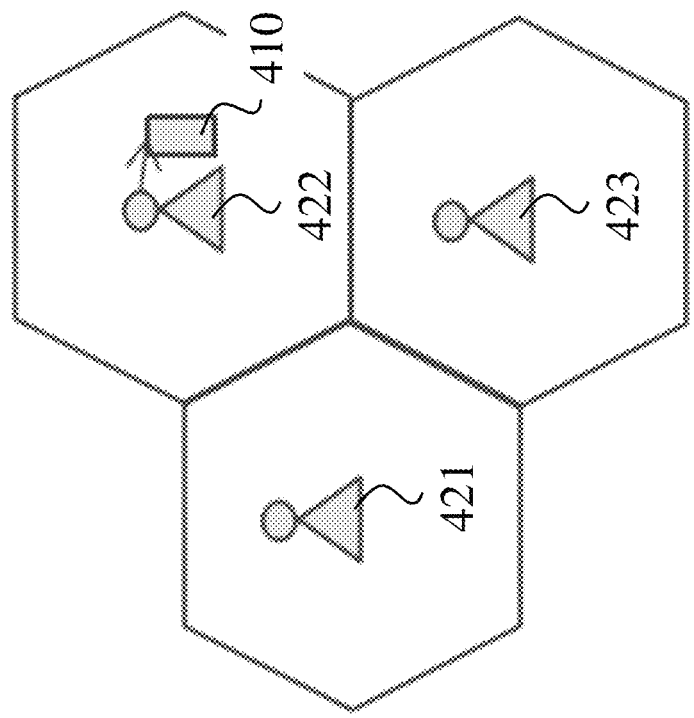
FIGS. 4A and 4B show another example of timing adjustment, in accordance with some embodiments of the presently disclosed technology.
Figure 4B:
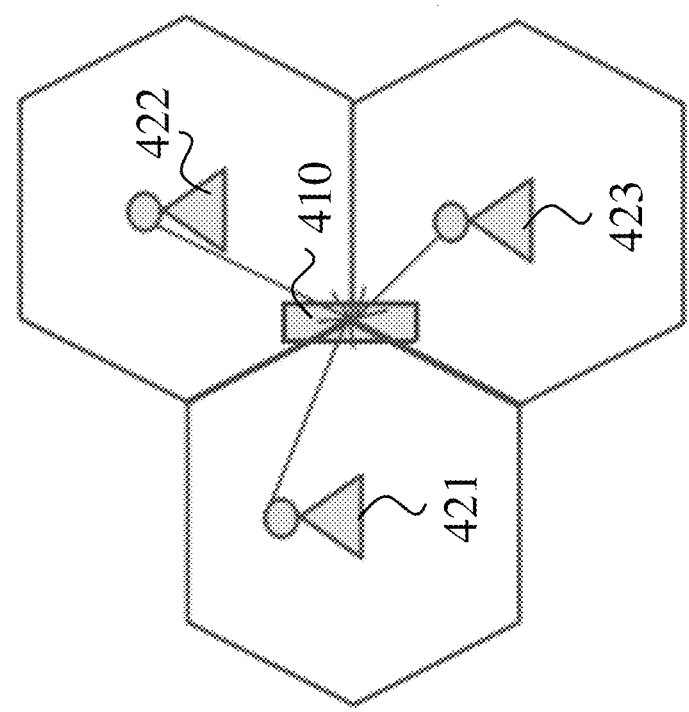

Having obtained the location of the BS via the broadcast, the UE may determine its location, for example, by measuring the downlink primary or secondary synchronization signals (PSS/SSS signals, respectively) from three neighboring base stations. In an example, and as shown in FIG. 4A, the UE 410 may measure the reference signal receive power (RSRP) from the reference signal from the base stations 421, 422 and 423 and determine that the RSRP is approximately equal, and thereby determine that it is located at the cell edge. In another example, and as shown in FIG. 4B, the UE 410 may measure that the RSRP from base station 422 is significantly greater than the RSRP from the other two base stations (421 and 423), and thereby determine that it is located at the center of the cell. In both cases, the UE may determine a horizontal distance between the UE and the BS based on radius information of the cell. This may be combined with height information of the BS and the UE to determine the distance d between the terminal (UE) and the base station using, for example, the formula:

$$d=\sqrt{d_1^2+(h_1-h_2)^2}.$$

Herein, $d_1$ is the horizontal distance from the terminal to the base station, $h_1$ and $h_2$ are the heights of the base station and the terminal, respectively. Given this distance, the timing adjustment $(t_{TA})$ may be computed as:

$$t_{TA}=2d/c.$$

Herein, c is the speed of light. Having computed the timing adjustment, the UE transmits data to the base station according to $t_{TA}$. In some embodiments, a modulation and coding scheme (MCS) and/or retransmission times may be determined based on distance d or a threshold when transmitting the data.

In some embodiments, the subcarrier spacing of the time-frequency resource for transmitting data may be 60 kHz, 30 kHz, 15 kHz, 7.5 kHz, 3.75 kHz or 1.25 kHz, and the data symbols are CP-OFDM symbols or DFT-S-OFDM symbols. In some embodiments, the transmitted data may include user identification information, establishment cause, uplink signaling information or information of the downlink beams transmitted by the base station and acquired by the UE. In an example, the user identification information may be a unique ID of length 39 bits or may be a unique ID of length 48 bits or may be a temporary ID of 16 bits, such as a C-RNTI. Furthermore, the transmitted data may additionally include at least one of the following: (a) data symbols processed by a spreading technique, (b) a pilot symbol or a reference signal or (c) a preamble sequence. In some embodiments, the transmitted data may include the information of the spreading code or the index of the spreading code in a code set or the information of the generation of the spreading code. For example, when the k-th modulation symbol of the user is $s_k$, it is spread by a spreading sequence of length L, where the spreading sequence is $[c_{k1}, c_{k2}, \ldots, c_{kL}]$ with $L \geq 1$, resulting in the spread symbol being given as:

$$s_k*[c_{k1},c_{k2},\ldots,c_{kL}]=[s_k c_{k1}, s_k c_{k2}, \ldots, s_k c_{kL}].$$

In an example, the cyclic prefix of the data (for the CP-OFDM or DFT-S-OFDM waveform) is an extended CP (ECP) as defined in LTE or 5G NR, which is greater than the sum of the residual TA error and the multipath delay of the channel.

Embodiment 3. In some embodiments, system information is broadcast by the base station and received by the UE. Having obtained the frequency information of the BS via the broadcast, the UE may determine its location, for example, by measuring the downlink primary or secondary synchronization signals (PSS/SSS signals, respectively) or reference signal, and obtaining the path loss value from the base station to the terminal (UE) by the following formula:

$$PL=P_{TX}-P_{RX}.$$

Herein, the path loss (PL) from the base station to the terminal is a difference between the transmit power of the base station $(P_{TX})$ and the signal power of the base station is measured by the terminal $(P_{RX})$. The distance d between the terminal (UE) and the base station may be determined according to a path loss formula or from a look-up table. Given this distance, the timing adjustment $(t_{TA})$ may be computed as:

$$t_{TA}=2d/c.$$

Herein, c is the speed of light. Having computed the timing adjustment, the UE transmits data to the base station according to $t_{TA}$. In some embodiments, a modulation and coding scheme (MCS) and/or retransmission times may be determined based on distance d or a threshold when transmitting the data.

In some embodiments, the subcarrier spacing of the time-frequency resource for transmitting data may be 60 kHz, 30 kHz, 15 kHz, 7.5 kHz, 3.75 kHz or 1.25 kHz, and the data symbols are CP-OFDM symbols or DFT-S-OFDM symbols. In some embodiments, the transmitted data may include user identification information, establishment cause, uplink signaling information or information of the downlink beams transmitted by the base station and acquired by the UE. In an example, the user identification information may be a unique ID of length 39 bits or may be a unique ID of length 48 bits or may be a temporary ID of 16 bits, such as a C-RNTI. Furthermore, the transmitted data may additionally include at least one of the following: (a) data symbols processed by a spreading technique, (b) a pilot symbol or a reference signal or (c) a preamble sequence. In some embodiments, the transmitted data may include the information of the spreading code or the index of the spreading code in a code set or the information of the generation of the spreading code. For example, when the k-th modulation symbol of the user is $s_k$, it is spread by a spreading sequence of length L, where the spreading sequence is $[c_{k1}, c_{k2}, \ldots, c_{kL}]$ with $L \geq 1$, resulting in the spread symbol being given as:

$$s_k * [c_{k1}, c_{k2}, \ldots, c_{kL}] = [s_k c_{k1}, s_k c_{k2}, \ldots, s_k c_{kL}].$$

In an example, the cyclic prefix of the data (for the CP-OFDM or DFT-S-OFDM waveform) is an extended CP (ECP) as defined in LTE or 5G NR, which is greater than the sum of the residual TA error and the multipath delay of the channel.

Figure 5:
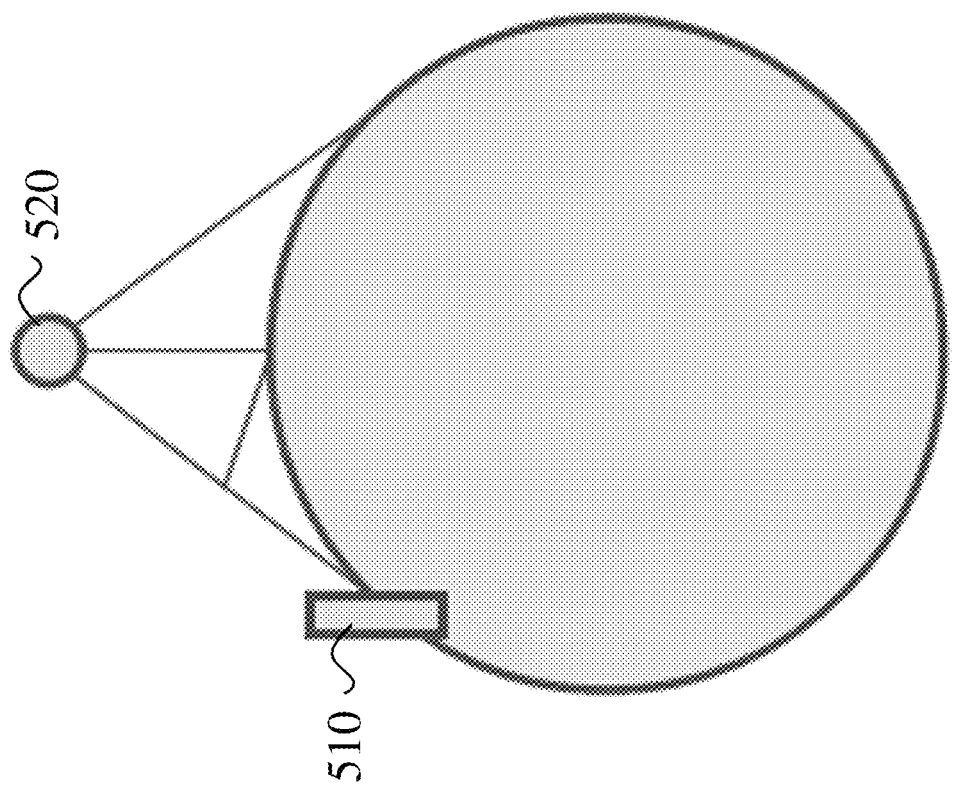
FIG. 5 shows yet another example of timing adjustment, in accordance with some embodiments of the presently disclosed technology.

Embodiment 4. In some embodiments, and shown in FIG. 5, the transmission is between a satellite 520 and a UE 510, and the location information is broadcast by a satellite 520 and received by the UE 510. The UE acquires satellite ephemeris information in the broadcast information, and determines position information for the satellite, which may include longitude, latitude and height information. In an example, the broadcast information may be explicit location bit information (e.g., coordinates in a predetermined coordinate system), which usually requires FEC coding protection. In another example, the broadcast information may be pilot sequences, wherein different pilot sequences represent different location information.

Having obtained the location of the satellite 520 via the broadcast, the UE 510 may determine its location using, for example, a satellite positioning system or a ground positioning system. Based on the location information of the base station and its own location information, the distance d between the UE and the satellite is calculated by the following formula:

$$d = \sqrt{r_1^2 + r_2^2 - 2r_1 r_2 \cos\theta}.$$

Herein, $r_1$ is the average radius of the Earth, $r_2$ is the distance between the satellite and the Earth's center, and $\theta$ is the Earth's central angle that is computed using:

$$\cos\theta = \sin\phi \sin\varphi + \cos\phi \cos\varphi \cos(\varepsilon - \tau).$$

Herein, $(\varepsilon, \phi)$ and $(\tau, \varphi)$ the latitude and longitude of the terrestrial equipment (UE) and the satellite, respectively. Given this distance, the timing adjustment $(t_{TA})$ may be computed as:

$$t_{TA} = 2d/c.$$

Herein, c is the speed of light. Having computed the timing adjustment, the UE transmits data to the base station according to $t_{TA}$. In some embodiments, a modulation and coding scheme (MCS) and/or retransmission times may be determined based on distance d or a threshold when transmitting the data.

In some embodiments, the subcarrier spacing of the time-frequency resource for transmitting data may be 60 kHz, 30 kHz, 15 kHz, 7.5 kHz, 3.75 kHz or 1.25 kHz, and the data symbols are CP-OFDM symbols or DFT-S-OFDM symbols. In some embodiments, the transmitted data may include user identification information, establishment cause, uplink signaling information or information of the downlink beams transmitted by the base station and acquired by the UE. In an example, the user identification information may be a unique ID of length 39 bits or may be a unique ID of length 48 bits or may be a temporary ID of 16 bits, such as a C-RNTI. Furthermore, the transmitted data may additionally include at least one of the following: (a) data symbols processed by a spreading technique, (b) a pilot symbol or a reference signal or (c) a preamble sequence. In some embodiments, the transmitted data may include the information of the spreading code or the index of the spreading code in a code set or the information of the generation of the spreading code. For example, when the k-th modulation symbol of the user is $s_k$, it is spread by a spreading sequence of length L, where the spreading sequence is $[c_{k1}, c_{k2}, \ldots, c_{kL}]$ with $L \geq 1$, resulting in the spread symbol being given as:

$$s_k * [c_{k1}, c_{k2}, \ldots, c_{kL}] = [s_k c_{k1}, s_k c_{k2}, \ldots, s_k c_{kL}].$$

In an example, the cyclic prefix of the data (for the CP-OFDM or DFT-S-OFDM waveform) is an extended CP (ECP) as defined in LTE or 5G NR, which is greater than the sum of the residual TA error and the multipath delay of the channel.

Embodiment 5. In some embodiments, the transmission is between a drone or a hot air balloon and a UE, and the location information is broadcast by a drone or a hot air balloon and received by the UE. Having obtained the location of the drone or hot air balloon via the broadcast, the UE may determine its own location using, for example, a satellite positioning system or a ground positioning system. Based on the location information of the drone or hot air balloon and its own location information, the distance d between the UE and the drone or hot air balloon is calculated by the following formula:

$$d = \sqrt{(x_1 - x_2)^2 + (y_1 - y_2)^2}.$$

Herein, $(x_1, y_1)$ is the location of the ground terminal (UE) and $(x_2, y_2)$ is the location of the drone or hot air balloon in the same plane. In another embodiment, the distance d between the UE and the drone or hot air balloon is calculated by the following formula:

$$d = \sqrt{(x_1 - x_2)^2 + (y_1 - y_2)^2 + (z_1 - z_2)^2}.$$

Herein, $(x_1, y_1, z_1)$ is the location of the ground terminal (UE) and $(x_2, y_2, z_2)$ is the location of the drone or hot air balloon in a three-dimensional coordinate system. Given this distance, the timing adjustment $(t_{TA})$ may be computed as:

$$t_{TA} = 2d/c.$$

Herein, c is the speed of light. Having computed the timing adjustment, the UE transmits data to the base station according to $t_{TA}$. In some embodiments, a modulation and coding scheme (MCS) and/or retransmission times may be determined based on distance d or a threshold when transmitting the data.

In some embodiments, the subcarrier spacing of the time-frequency resource for transmitting data may be 60 kHz, 30 kHz, 15 kHz, 7.5 kHz, 3.75 kHz or 1.25 kHz, and the data symbols are CP-OFDM symbols or DFT-S-OFDM symbols. In some embodiments, the transmitted data may include user identification information, establishment cause, uplink signaling information or information of the downlink beams transmitted by the base station and acquired by the UE. In an example, the user identification information may be a unique ID of length 39 bits or may be a unique ID of length 48 bits or may be a temporary ID of 16 bits, such as a C-RNTI. Furthermore, the transmitted data may additionally include at least one of the following: (a) data symbols processed by a spreading technique, (b) a pilot symbol or a reference signal or (c) a preamble sequence. In some embodiments, the transmitted data may include the information of the spreading code or the index of the spreading code in a code set or the information of the generation of the spreading code. For example, when the k-th modulation symbol of the user is $s_k$, it is spread by a spreading sequence of length L, where the spreading sequence is $[c_{k1}, c_{k2}, \ldots, c_{kL}]$ with $L \geq 1$, resulting in the spread symbol being given as:

$$s_k * [c_{k1}, c_{k2}, \ldots, c_{kL}] = [s_k c_{k1}, s_k c_{k2}, \ldots, s_k c_{kL}].$$

In an example, the cyclic prefix of the data (for the CP-OFDM or DFT-S-OFDM waveform) is an extended CP (ECP) as defined in LTE or 5G NR, which is greater than the sum of the residual TA error and the multipath delay of the channel.

Embodiment 6. In some embodiments, the UE transmits data to the BS based on a timing adjustment that is determined based on a distance between the UE and the BS, as described in Embodiments 1-5.

In some embodiments, the modulation and coding scheme (MCS) and number of retransmissions, for example, are selected based on the distance or a threshold value of the transmitter and receiver when transmitting data. In an example, if the threshold value is greater than or equal to a certain first threshold, the MCS defines using QPSK and a rate 1/2 code, a preamble selected from preamble set 1, and a demodulation reference signal (DMRS) selected from DMRS set 1. Otherwise (e.g., the threshold value being less than the certain first threshold), the MCS defines using QPSK a rate 1/5 code, a preamble selected from preamble set 2, and a DMRS selected from DMRS set 2.

In some embodiments, the subcarrier spacing of the time-frequency resource for transmitting data may be 60 kHz, 30 kHz, 15 kHz, 7.5 kHz, 3.75 kHz or 1.25 kHz, and the data symbols are CP-OFDM symbols or DFT-S-OFDM symbols. In some embodiments, the transmitted data may include user identification information, establishment cause, uplink signaling information or information of the downlink beams transmitted by the base station and acquired by the UE. In an example, the user identification information may be a unique ID of length 39 bits or may be a unique ID of length 48 bits or may be a temporary ID of 16 bits, such as a C-RNTI. Furthermore, the transmitted data may additionally include at least one of the following: (a) data symbols processed by a spreading technique, (b) a pilot symbol or a reference signal or (c) a preamble sequence. In some embodiments, the transmitted data may include the information of the spreading code or the index of the spreading code in a code set or the information of the generation of the spreading code. For example, when the k-th modulation symbol of the user is $s_k$, it is spread by a spreading sequence of length L, where the spreading sequence is $[c_{k1}, c_{k2}, \ldots, c_{kL}]$ with $L \geq 1$, resulting in the spread symbol being given as:

$$s_k * [c_{k1}, c_{k2}, \ldots, c_{kL}] = [s_k c_{k1}, s_k c_{k2}, \ldots, s_k c_{kL}].$$

In an example, the cyclic prefix of the data (for the CP-OFDM or DFT-S-OFDM waveform) is an extended CP (ECP) as defined in LTE or 5G NR, which is greater than the sum of the residual TA error and the multipath delay of the channel.

Embodiment 7. In some embodiments, location information is broadcast by the base station and received by the UE. In an example, the broadcast information may be explicit location bit information (e.g., coordinates in a predetermined coordinate system), which usually requires FEC coding protection. In another example, the broadcast information may be pilot sequences, wherein different pilot sequences represent different location information.

In some embodiments, the uplink data transmitted by the terminal (UE) is a data symbol that is processed using a spreading technique, and is subsequently processed using blind detection by the BS. If the transmitted data includes the information of the spreading code or the index of the spreading code in a code set or the information of the generation of the spreading code, the spreading code can be used to make a precise reconstruction of the spread data symbols and assist the blind detection procedure. If the uplink data includes pilot symbols, the pilot symbols are used to assist the blind detection procedure. If the uplink data includes preamble information, the preamble information is used to calibrate the timing adjustment (TA). If the uplink information includes user identification information, the user identification information is obtained. If the uplink information includes uplink signaling information, the BS acquires uplink signaling information.

Exemplary Methods for the Disclosed Technology

Embodiments of the disclosed technology advantageously result in, among other features, reduced latency requirements and lower overhead usage based on the open-loop timing adjustment techniques described herein. In some embodiments, the presently disclosed technology may be characterized by the following features:

A first node acquires a distance between the first node and the second node, determines a timing advance (or adjustment) amount, and transmits data according to the timing advance amount.

The first communication node is a terminal, a terrestrial device for satellite communication or other communication device, and the second communication node is a base station, a receiver on a satellite or other communication device.

The first communication node acquires location information of the first communication node and the second communication node, and then obtains a distance between the two based on the location information of the first and second communication nodes, or the first communication node acquires a distance from the second communication node based on the downlink signal of the second communication node.

The timing advance is determined based on a formula or determined by using a look-up table.

The transmitted data includes at least one of user identification information, uplink signaling information, or beam information.

The transmitted data includes at least one of a data symbol processed by a spreading techniques, a pilot symbol or a reference signal or a preamble sequence.

The modulation and coding scheme (MCS) and/or a number of retransmissions are selected based on the distance or a threshold.

Acquiring location information of the second communication node is based on broadcast information of the second communication node.

Acquiring location information of the first communication node is based on a satellite positioning system, a ground positioning system, a cellular positioning system, a positioning system based on a base station or a downlink signal.

The first communication node acquires a distance from the second communication node based on a downlink signal from the second communication node, which includes a downlink primary synchronization signal or a secondary synchronization signal (PSS/SSS, respectively) or a reference signal (RS).

The user identification information and the uplink signaling information are modulated using BPSK or $\pi/2$-BPSK, quadrature phase shift keying (QPSK), differential BPSK modulation, differential QPSK modulation or differential coding.

The preamble set or the demodulation reference signal set is selected based on the selected modulation and coding scheme (MCS) during data transmission.

The second communication node broadcasts its own location information, which may include longitude and latitude information, height information, or ephemeris information.

Figure 6:
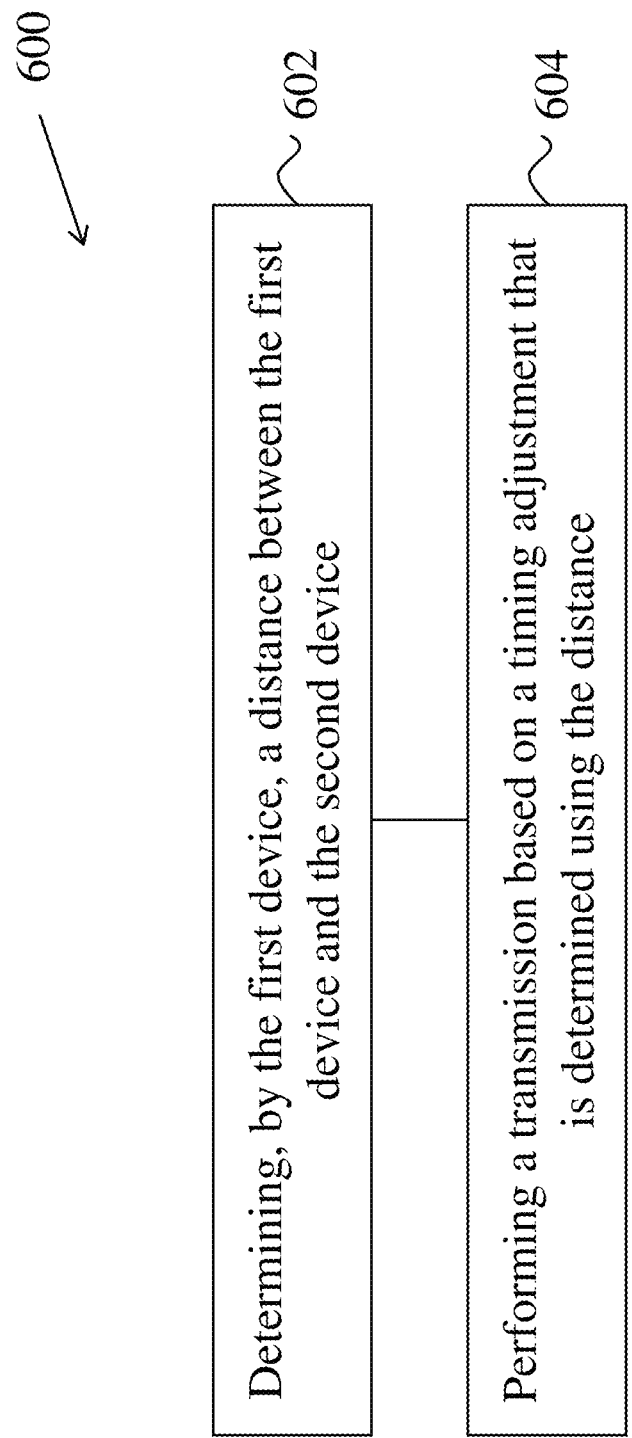
FIG. 6 is a flowchart of an example of a wireless communication method.

FIG. 6 shows another example of a wireless communication method 600 for timing adjustments for data transmission. The method 600 includes, at step 602, determining, by the first device, a distance between the first device and the second device. In some embodiments, determining the distance is based on a location information of the first device and a location information of the second device.

The method 600 includes, at step 604, performing a transmission based on a timing adjustment that is determined using the distance.

In some embodiments, the method 600 further includes the step of receiving, from the second device, the location information of the second device. In some embodiments, the location information is broadcast by the second device.

In some embodiments, the method 600 further includes the steps of receiving a reference signal from the second device, computing a path loss value based on a reference signal receive power (RSRP) value determined from the reference signal, and determining the distance based on the path loss value.

In some embodiments, the method 600 further includes the steps of receiving a plurality of downlink signals from each of a plurality of base stations, determining each of a plurality of receive power values based on each of the plurality of downlink signals, and determining the distance between the first device and the second device based on the plurality of receive power values.

In some embodiments, the method 600 further includes the steps of receiving a plurality of reference signals from each of a plurality of base stations, determining each of a plurality of RSRP values based on each of the plurality of reference signals, and determining a location of the first device based on the plurality of RSRP values.

Figure 7:
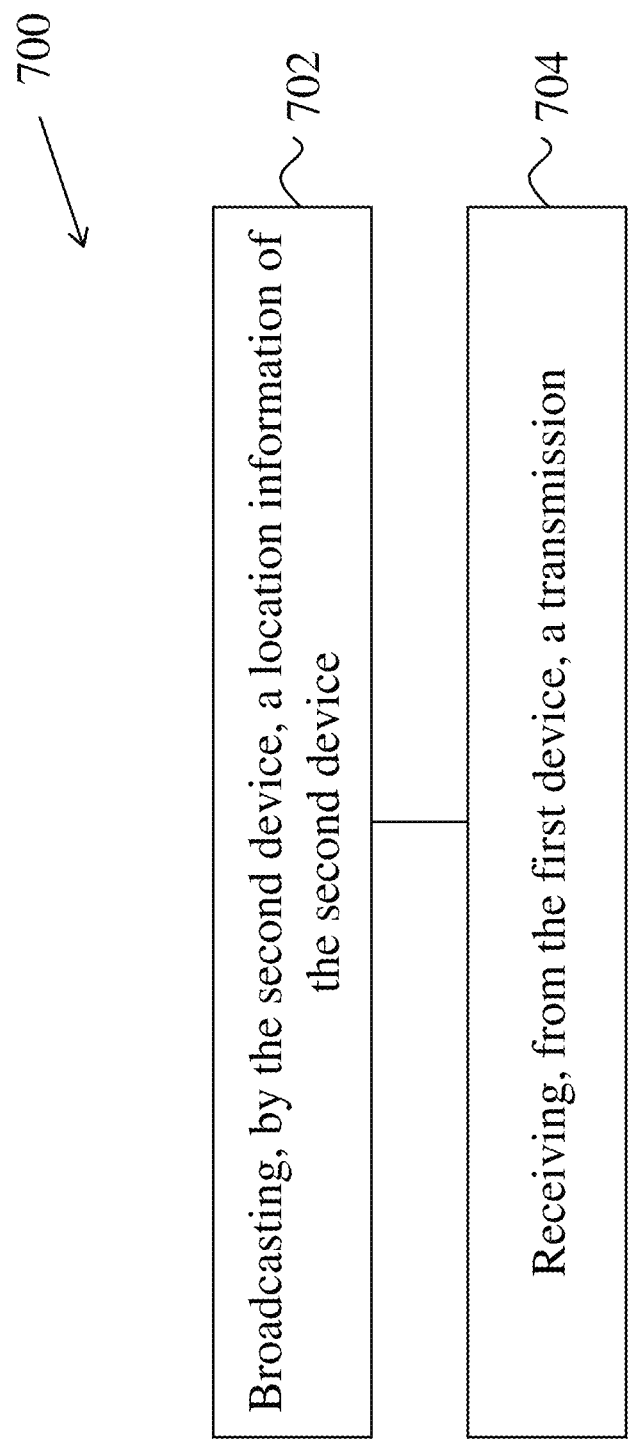
FIG. 7 is a flowchart of another example of a wireless communication method.

FIG. 7 shows an example of a wireless communication method 700 for timing adjustments for data transmission. This example includes some features and/or steps that are similar to those shown in FIG. 6, and described above. At least some of these features and/or steps may not be separately described in this section.

The method 700 includes, at step 702, broadcasting, by the second device, a location information of the second device.

The method 700 includes, at step 704, receiving, from the first device, a transmission. In some embodiments, the first device is configured to communicate the transmission based on a timing adjustment that is determined using the distance, and the distance is based on a location information of the first device and the location information of the second device. In some embodiments, receiving the signal is based on performing blind detection.

In some embodiments, and in the context of methods 600 and 700, the location information of the second device is broadcast through a physical broadcast channel (PBCH), a Master Information Block (MIB) or a System Information Block (SIB). In other embodiments, the location information of the second device comprises at least one of (a) latitude and longitude information for the second device, (b) height information for the second device, or (c) ephemeris information for the second device, wherein a location of the second device is determined based on the at least one of (a), (b) or (c). In yet other embodiments, the location information of the first device is based on a satellite positioning system, a ground positioning system, a cellular positioning system or a positioning system based on a base station.

In some embodiments, the transmission comprises at least one of an identification information for the first device, uplink signaling information or information of the downlink beams transmitted by the base station and acquired by the UE. In an example, the transmission is modulated using binary phase shift keying (BPSK), $\pi/2$-BPSK or quadrature phase shift keying (QPSK), differential BPSK modulation, differential QPSK modulation or differential coding.

In some embodiments, the transmission comprises one or more of a data symbol processed using a spreading technique, a reference signal or a preamble sequence. In an example, the transmission is spread using exactly one of a plurality of spreading sequences. In another example, a determination of the reference signal or the preamble sequence is based on a modulation and coding scheme.

In some embodiments, a modulation and coding scheme for the transmission is based on the distance or a threshold. In other embodiments, a number of retransmissions of the transmission is based on the distance or a threshold. In yet other embodiments, a determination of the timing adjustment is based on a computation or a look-up table. In yet other embodiments, the first device is one of a user terminal, a wireless device, or a terrestrial device for satellite communication, and wherein the second device is one of a base station, a network device or a transceiver on a satellite, hot air balloon or drone.

Implementations for the Disclosed Technology

Figure 8:
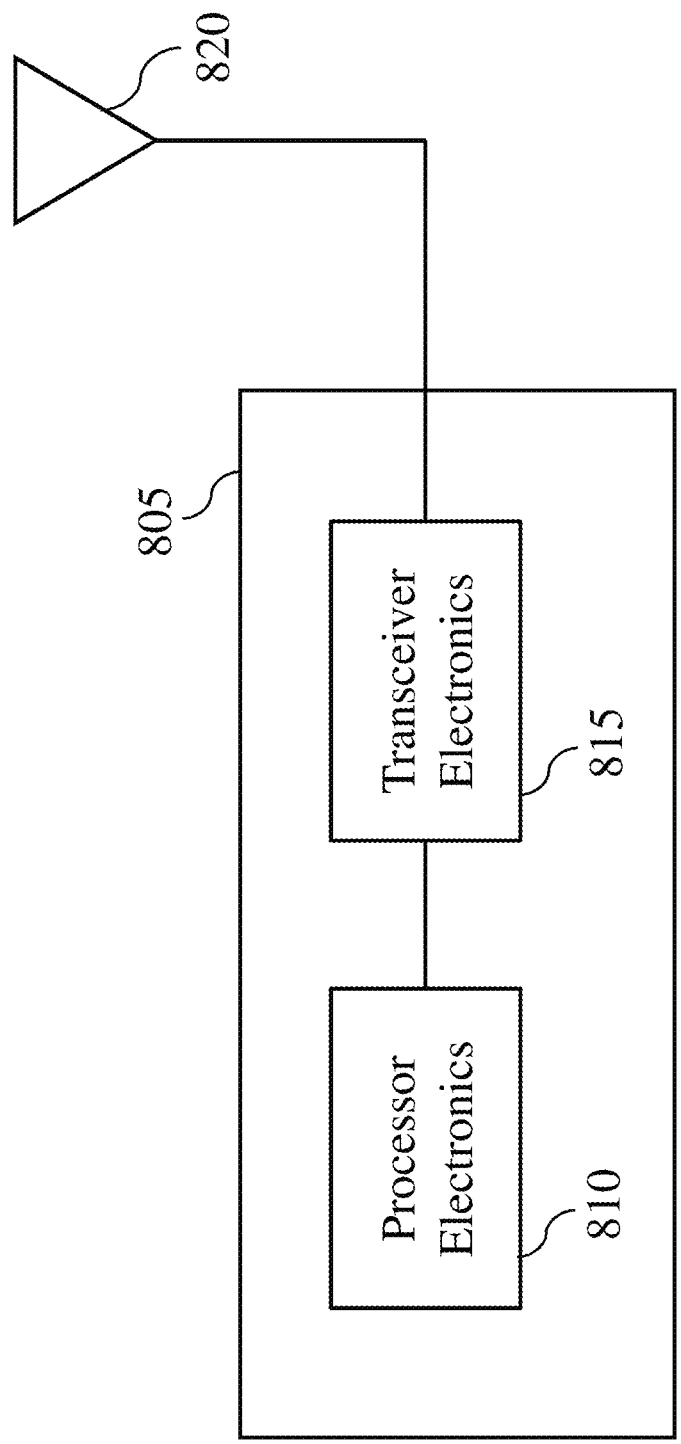
FIG. 8 is a block diagram representation of a portion of an apparatus, in accordance with some embodiments of the presently disclosed technology.

FIG. 8 is a block diagram representation of a portion of an apparatus, in accordance with some embodiments of the presently disclosed technology. An apparatus 805, such as a base station or a wireless device (or UE), can include processor electronics 810 such as a microprocessor that implements one or more of the techniques presented in this document. The apparatus 805 can include transceiver electronics 815 to send and/or receive wireless signals over one or more communication interfaces such as antenna(s) 820. The apparatus 805 can include other communication interfaces for transmitting and receiving data. Apparatus 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the apparatus 805.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication between a first device and a second device, the method comprising:
   receiving, by the first device, a location information of the second device that includes a height information of the second device, the location information being represented as a location bit information or pilot sequences;
   determining, by the first device, a location of the first device based on a reference signal receive power (RSRP) value of a reference signal from the second device, the determining includes whether the first device is located at an edge of a cell or a center of the cell;
   determining, by the first device, a distance between the first device and the second device, wherein the distance is determined using a formula based on 1) a horizontal distance between the first device and the second device based on radius information of the cell and 2) a height information of the first device and the height information of the second device that is received from the second device; and
   performing a transmission based on a timing adjustment that is determined using the distance, wherein the transmission comprises at least one of an identification information for the first device, uplink signaling information or beam information, and
   wherein a modulation and coding scheme for the transmission is determined based on the distance determined by the first device, and
   wherein at least one of a preamble set or a demodulation reference signal set is selected based on the modulation and coding scheme for the transmission,
   wherein the performing of the transmission includes transmitting data that includes information of a spreading code for reconstructing of spread data symbol.

2. The method of claim 1, wherein determining the distance is based on a location information of the first device and a location information of the second device.

3. The method of claim 1, wherein the location information of the second device is broadcast by the second device.

4. The method of claim 1, further comprising:
   receiving the reference signal from the second device;
   computing a path loss value based on the reference signal receive power (RSRP) value determined from the reference signal; and
   determining the distance based on the path loss value.

5. The method of claim 1, further comprising:
receiving a plurality of downlink signals from each of a plurality of base stations;
determining each of a plurality of receive power values based on each of the plurality of downlink signals; and
determining the distance between the first device and the second device based on the plurality of receive power values.

6. The method of claim 1, further comprising:
receiving a plurality of reference signals from each of a plurality of base stations;
determining each of a plurality of reference signal receive power (RSRP) values based on each of the plurality of reference signals; and
wherein the location of the first device is determined further based on the plurality of RSRP values.

7. The method of claim 1, wherein the transmission is modulated using binary phase shift keying (BPSK), π/2-BPSK, quadrature phase shift keying (QPSK), differential BPSK modulation, differential QPSK modulation or differential coding.

8. The method of claim 1, wherein the transmission comprises one or more of a data symbol processed using a spreading technique, a reference signal or a preamble sequence.

9. The method of claim 8, wherein the transmission is spread using exactly one of a plurality of spreading sequences.

10. The method of claim 8, wherein a determination of the reference signal or the preamble sequence is based on the modulation and coding scheme.

11. The method of claim 1, wherein a number of retransmissions of the transmission is based on the distance or a threshold.

12. The method of claim 1, wherein the first device is one of a user terminal, a wireless device, or a terrestrial device for satellite communication, and wherein the second device is one of a base station, a network device or a transceiver on a satellite, hot air balloon or drone.

13. A method for wireless communication between a first device and a second device, the method comprising:
broadcasting, by the second device, a location information of the second device that includes a height information of the second device, the location information being represented as a location bit information or pilot sequences;
receiving, from the first device, a transmission,
wherein the transmission is communicated from the first device based on a timing adjustment that is determined by the first device based on a distance between the first device and the second device, and wherein the distance is based on a location information of the first device and the location information of the second device, and
wherein the location information of the first device is determined by the first device to be located at an edge of a cell or a center of the cell by the first device based on a reference signal receive power (RSRP) value of a reference signal from the second device, and wherein the distance is determined using a formula that is based on 1) a horizontal distance between the first device and the second device based on radius information of the cell and 2) a height information of the first device and the height information of the second device that is broadcasted from the second device,
wherein a modulation and coding scheme for the transmission is determined based on the distance determined by the first device, and
wherein at least one of a preamble set or a demodulation reference signal set is selected based on the modulation and coding scheme for the transmission,
wherein the receiving of the transmission includes receiving data that includes information of a spreading code for reconstructing of spread data symbol.

14. The method of claim 13, wherein receiving the signal is based on performing blind detection.

15. The method of claim 13, wherein the location information of the second device is broadcast through a physical broadcast channel (PBCH), a Master Information Block (MIB) or a System Information Block (SIB).

16. The method of claim 13, wherein the location information of the second device comprises at least one of (a) latitude and longitude information for the second device, (b) height information for the second device, or (c) ephemeris information for the second device, wherein a location of the second device is determined based on the at least one of (a), (b) or (c).

17. The method of claim 13, wherein the location information of the first device is based on a satellite positioning system, a ground positioning system, a cellular positioning system or a positioning system based on base stations.

* * * * *